(12) United States Patent
Sabo

(10) Patent No.: US 12,299,464 B2
(45) Date of Patent: May 13, 2025

(54) SYSTEMS AND METHODS FOR DETERMINING AND PRESENTING A GRAPHICAL USER INTERFACE INCLUDING TEMPLATE METRICS

(71) Applicant: Asana, Inc., San Francisco, CA (US)

(72) Inventor: Gregory Louis Sabo, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 18/474,471

(22) Filed: Sep. 26, 2023

(65) Prior Publication Data

US 2024/0012661 A1 Jan. 11, 2024

Related U.S. Application Data

(63) Continuation of application No. 17/673,500, filed on Feb. 16, 2022, now Pat. No. 11,782,737, which is a
(Continued)

(51) Int. Cl.
  *G06F 3/048* (2013.01)
  *G06F 3/0482* (2013.01)
  (Continued)

(52) U.S. Cl.
  CPC ............ *G06F 9/451* (2018.02); *G06F 3/0482* (2013.01); *G06F 40/186* (2020.01)

(58) Field of Classification Search
  CPC ....... G06F 9/451; G06F 40/186; G06F 3/0482
  See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.
(Continued)

*Primary Examiner* — David Phantana-angkool
(74) *Attorney, Agent, or Firm* — Esplin & Associates, PC

(57) ABSTRACT

Systems and methods for determining and presenting a graphical user interface including template metrics are disclosed. Exemplary implementations may: manage templates for work unit records that define units of work managed, created, and/or assigned within a collaboration environment; create one or more first work unit records based on the first template; monitor the units of work created using the templates to determine template information; determine template metric values for template metrics associated with the templates based on the template information such that first template metric values for the template metrics associated with the first template are determined based on the first template information; and effectuate presentation of a graphical user interface including the templates and the template metric values for the template metrics associated with the templates.

20 Claims, 4 Drawing Sheets

Related U.S. Application Data continuation of application No. 17/127,173, filed on Dec. 18, 2020, now Pat. No. 11,288,081, which is a continuation of application No. 16/823,766, filed on Mar. 19, 2020, now Pat. No. 10,922,104, which is a continuation of application No. 16/242,841, filed on Jan. 8, 2019, now Pat. No. 10,684,870.

(51) Int. Cl.
*G06F 9/451* (2018.01)
*G06F 40/186* (2020.01)

(56) References Cited

U.S. PATENT DOCUMENTS

| | | | |
|---|---|---|---|
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |
| 6,769,013 | B2 | 7/2004 | Frees |
| 6,859,523 | B1 | 2/2005 | Jilk |
| 6,938,048 | B1 | 8/2005 | Jilk |
| 7,003,668 | B2 | 2/2006 | Berson |
| 7,020,697 | B1 | 3/2006 | Goodman |
| 7,039,596 | B1 | 5/2006 | Lu |
| 7,039,654 | B1 | 5/2006 | Eder |
| 7,086,062 | B1 | 8/2006 | Faour |
| 7,146,326 | B1 | 12/2006 | White |
| 7,155,400 | B1 | 12/2006 | Jilk |
| 7,349,920 | B1 | 3/2008 | Feinberg |
| 7,401,131 | B2 | 7/2008 | Robertson |
| 7,418,482 | B1 | 8/2008 | Lusher |
| 7,428,723 | B2 | 9/2008 | Greene |
| 7,640,511 | B1 | 12/2009 | Keel |
| 7,644,145 | B2 | 1/2010 | Rockwell |
| 7,676,542 | B2 | 3/2010 | Moser |
| 7,702,532 | B2 | 4/2010 | Vigil |
| 7,778,866 | B2 | 8/2010 | Hughes |
| 7,779,039 | B2 | 8/2010 | Weissman |
| RE41,737 | E | 9/2010 | Leem |
| 7,792,795 | B1 | 9/2010 | Swartz |
| 7,805,327 | B1 | 9/2010 | Schulz |
| RE41,848 | E | 10/2010 | Daniell |
| 7,831,978 | B2 | 11/2010 | Schaad |
| 7,840,943 | B2 | 11/2010 | Volkov |
| 7,917,855 | B1 | 3/2011 | Satish |
| 7,941,453 | B1 | 5/2011 | Scheevel |
| 7,945,469 | B2 | 5/2011 | Cohen |
| 7,996,744 | B2 | 8/2011 | Ojala |
| 7,996,774 | B1 | 8/2011 | Sidenur |
| 8,214,747 | B1 | 7/2012 | Yankovich |
| 8,314,809 | B1 | 11/2012 | Grabowski |
| 8,499,300 | B2 | 7/2013 | Zimberg |
| 8,522,240 | B1 | 8/2013 | Merwarth |
| 8,527,287 | B1 | 9/2013 | Bhatia |
| 8,554,832 | B1 | 10/2013 | Moskovitz |
| 8,572,477 | B1 | 10/2013 | Moskovitz |
| 8,626,547 | B2 | 1/2014 | Hirano |
| 8,627,199 | B1 | 1/2014 | Handley |
| 8,639,552 | B1 | 1/2014 | Chen |
| 8,768,751 | B2 | 7/2014 | Jakowski |
| 8,831,879 | B2 | 9/2014 | Stamm |
| 8,843,832 | B2 | 9/2014 | Frields |
| 8,863,021 | B1 | 10/2014 | Bee |
| 9,009,096 | B2 | 4/2015 | Pinckney |
| 9,024,752 | B2 | 5/2015 | Tumayan |
| 9,143,839 | B2 | 9/2015 | Reisman |
| 9,152,668 | B1 | 10/2015 | Moskovitz |
| 9,201,952 | B1 | 12/2015 | Chau |
| 9,208,262 | B2 | 12/2015 | Bechtel |
| 9,251,484 | B2 | 2/2016 | Cantor |
| 9,350,560 | B2 | 5/2016 | Hupfer |
| 9,383,917 | B2 | 7/2016 | Mouton |
| 9,405,532 | B1 | 8/2016 | Sullivan |
| 9,405,810 | B2 | 8/2016 | Smith |
| 9,454,623 | B1 | 9/2016 | Kaptsan |
| 9,514,424 | B2 | 12/2016 | Kleinbart |
| 9,600,136 | B1 | 3/2017 | Yang |
| 9,674,361 | B2 | 6/2017 | Ristock |
| 9,712,576 | B1 | 7/2017 | Gill |
| 9,785,445 | B2 | 10/2017 | Mitsui |
| 9,830,398 | B2 | 11/2017 | Schneider |
| 9,842,312 | B1 | 12/2017 | Rosati |
| 9,949,681 | B2 | 4/2018 | Badenes |
| 9,953,282 | B2 | 4/2018 | Shaouy |
| 9,959,420 | B2 | 5/2018 | Kiang |
| 9,978,040 | B2 | 5/2018 | Lee |
| 9,990,636 | B1 | 6/2018 | Lewis |
| 10,001,911 | B2 | 6/2018 | Breedvelt-Schouten |
| 10,003,693 | B2 | 6/2018 | Wolthuis |
| 10,083,412 | B2 | 9/2018 | Suntinger |
| 10,157,355 | B2 | 12/2018 | Johnson |
| 10,192,181 | B2 | 1/2019 | Katkar |
| 10,235,156 | B2 | 3/2019 | Johnson |
| 10,264,067 | B2 | 4/2019 | Subramani |
| 10,308,992 | B2 | 6/2019 | Chauvin |
| 10,373,084 | B2 | 8/2019 | Kurjanowicz |
| 10,373,090 | B2 | 8/2019 | Holm |
| 10,382,501 | B2 | 8/2019 | Malatesha |
| 10,455,011 | B2 | 10/2019 | Kendall |
| 10,496,943 | B2 | 12/2019 | De |
| 10,594,788 | B2 | 3/2020 | Larabie-Belanger |
| 10,606,859 | B2 | 3/2020 | Smith |
| 10,613,735 | B1 | 4/2020 | Karpe |
| 10,616,151 | B1 | 4/2020 | Cameron |
| 10,623,359 | B1 | 4/2020 | Rosenstein |
| 10,671,692 | B2 | 6/2020 | Koopman |
| 10,684,870 | B1 | 6/2020 | Sabo |
| 10,706,484 | B1 | 7/2020 | Murnock |
| 10,785,046 | B1 | 9/2020 | Raghavan |
| 10,810,222 | B2 | 10/2020 | Koch |
| 10,846,105 | B2 | 11/2020 | Granot |
| 10,846,297 | B2 | 11/2020 | Smith |
| 10,922,104 | B2 | 2/2021 | Sabo |
| 10,956,845 | B1 | 3/2021 | Sabo |
| 10,970,299 | B2 | 4/2021 | Smith |
| 10,977,434 | B2 | 4/2021 | Pelz |
| 10,983,685 | B2 | 4/2021 | Karpe |
| 11,082,281 | B2 | 8/2021 | Rosenstein |
| 11,095,468 | B1 | 8/2021 | Pandey |
| 11,113,667 | B1 | 9/2021 | Jiang |
| 11,138,021 | B1 | 10/2021 | Rosenstein |
| 11,140,174 | B2 | 10/2021 | Patel |
| 11,204,683 | B1 | 12/2021 | Sabo |
| 11,212,242 | B2 | 12/2021 | Cameron |
| 11,212,326 | B2 * | 12/2021 | Faulkner ............... H04M 3/568 |
| 11,263,228 | B2 | 3/2022 | Koch |
| 11,288,081 | B2 | 3/2022 | Sabo |
| 11,290,296 | B2 | 3/2022 | Raghavan |
| 11,327,645 | B2 | 5/2022 | Karpe |
| 11,341,444 | B2 | 5/2022 | Sabo |
| 11,341,445 | B1 | 5/2022 | Cheng |
| 2002/0065798 | A1 | 5/2002 | Bostleman |
| 2002/0082889 | A1 | 6/2002 | Oliver |
| 2002/0120480 | A1 | 8/2002 | Kroeger |
| 2002/0143594 | A1 | 10/2002 | Kroeger |
| 2003/0028595 | A1 | 2/2003 | Vogt |
| 2003/0036934 | A1 | 2/2003 | Ouchi |
| 2003/0041317 | A1 | 2/2003 | Sokolov |
| 2003/0097406 | A1 | 5/2003 | Stafford |
| 2003/0097410 | A1 | 5/2003 | Atkins |
| 2003/0126001 | A1 | 7/2003 | Northcutt |
| 2003/0200223 | A1 | 10/2003 | Hack |
| 2003/0225598 | A1 | 12/2003 | Yu |
| 2003/0233265 | A1 | 12/2003 | Lee |

(56) References Cited

U.S. PATENT DOCUMENTS

| | | |
|---|---|---|
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0216324 A1 | 9/2005 | Maithell |
| 2005/0222971 A1 | 10/2005 | Cary |
| 2006/0028917 A1 | 2/2006 | Wigginton |
| 2006/0041447 A1 | 2/2006 | Vucina |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0114809 A1 | 5/2008 | MacBeth |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |

(56) References Cited

U.S. PATENT DOCUMENTS

| | | |
|---|---|---|
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0358468 A1 | 12/2015 | Erhart |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1 | 6/2016 | Hakman |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0292620 A1 | 10/2016 | De |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0052656 A1 | 2/2017 | Ohsumi |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285149 A1 | 10/2018 | Bhandari |
| 2018/0285471 A1 | 10/2018 | Hao |
| 2018/0315491 A1 | 11/2018 | Filipovich |
| 2018/0316636 A1 | 11/2018 | Kamat |
| 2018/0331842 A1 | 11/2018 | Faulkner |
| 2018/0357049 A1 | 12/2018 | Epstein |
| 2018/0365626 A1 | 12/2018 | Mansour |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1* | 3/2019 | Purandare ............ G06Q 10/101 |

(56) References Cited

U.S. PATENT DOCUMENTS

| | | |
|---|---|---|
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0197487 A1 | 6/2019 | Jersin |
| 2019/0213509 A1 | 7/2019 | Burleson |
| 2019/0265821 A1 | 8/2019 | Pearl |
| 2019/0286462 A1 | 9/2019 | Bodnick |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1* | 12/2019 | Kalra ................ G06K 7/1404 |
| 2020/0019907 A1 | 1/2020 | Notani |
| 2020/0059539 A1 | 2/2020 | Wang |
| 2020/0063333 A1 | 2/2020 | Mahanty |
| 2020/0065736 A1 | 2/2020 | Relangi |
| 2020/0159507 A1* | 5/2020 | Bodin ................ G06F 8/33 |
| 2020/0160270 A1* | 5/2020 | Bodin ................ G06F 40/58 |
| 2020/0160377 A1* | 5/2020 | Bodin ................ G06F 40/58 |
| 2020/0160458 A1* | 5/2020 | Bodin ................ H04L 67/53 |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0150135 A1 | 5/2021 | Lereya |
| 2021/0150489 A1 | 5/2021 | Haramati |
| 2021/0157978 A1 | 5/2021 | Haramati |
| 2021/0166339 A1 | 6/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0319389 A1 | 10/2021 | Jafari |
| 2021/0320891 A1* | 10/2021 | Rosenstein .......... G06F 40/284 |
| 2021/0342785 A1 | 11/2021 | Mann |
| 2021/0342786 A1 | 11/2021 | Jiang |
| 2021/0350303 A1 | 11/2021 | Omar |
| 2021/0357380 A1 | 11/2021 | Morad |
| 2021/0357423 A1 | 11/2021 | Haramati |
| 2021/0357862 A1 | 11/2021 | Lereya |
| 2021/0357863 A1 | 11/2021 | Cohen |
| 2021/0382734 A1 | 12/2021 | Rosenstein |
| 2021/0383261 A1 | 12/2021 | Hanna |
| 2021/0390486 A1 | 12/2021 | Chu |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |
| 2022/0215315 A1 | 7/2022 | Sabo |
| 2022/0284340 A1 | 9/2022 | Choudhary |
| 2022/0343282 A1 | 10/2022 | Hood |
| 2022/0414323 A1 | 12/2022 | Sreenivasan |
| 2023/0118369 A1* | 4/2023 | Sabo ................ G06Q 10/103 705/301 |
| 2023/0153732 A1 | 5/2023 | Akers |
| 2023/0239261 A1* | 7/2023 | Cameron ................ H04L 51/04 709/206 |
| 2023/0308409 A1* | 9/2023 | Rosenstein ............ H04L 51/04 |
| 2023/0325747 A1* | 10/2023 | Sabo ................ G06Q 10/06316 705/7.26 |
| 2024/0012661 A1* | 1/2024 | Sabo ................ G06F 3/0482 |
| 2024/0223517 A1* | 7/2024 | Cameron ................ G06Q 50/01 |
| 2024/0323106 A1* | 9/2024 | Mann ................ H04L 41/064 |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

(56) References Cited

OTHER PUBLICATIONS

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv30 (Year: 2017) (24 pages).

How to Asana, Planning with Asana calendar, youtube excerpt, Feb. 14, 2017 https://www.youtube.com/watch?v=w816KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch? v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

D. Surian, N. Liu, D. Lo, H. Tong, E.-P. Lim and C. Faloutsos, "Recommending People in Developers' Collaboration Network," 2011 18th Working Conference on Reverse Engineering, Limerick, Ireland, 2011, pp. 379-388, doi: 10.1109/WCRE.2011.53 (Year: 2011).

\* cited by examiner

SYSTEMS AND METHODS FOR DETERMINING AND PRESENTING A GRAPHICAL USER INTERFACE INCLUDING TEMPLATE METRICS

FIELD OF THE DISCLOSURE

The present disclosure relates to systems and methods for determining and presenting a graphical user interface including template metrics.

BACKGROUND

Collaboration environments enable users to assign projects, tasks, or other assignments to assignees to complete. Such collaboration environments enable users to work in a more organized and efficient manner. However, creating projects and/or tasks takes time and may require experience to be successful.

SUMMARY

Users typically create projects, tasks, and/or other assignments via the collaboration environment from scratch. Some projects, tasks, and/or other assignments are similar to other projects, tasks, and/or other assignments to the previously been created and/or completed by other users within the collaboration environment. However, existing systems do not enable users to take advantage of such existing knowledge. The present system provides pre-populated templates that users can choose from. The present system determines and presents template metrics corresponding to the templates to provide users with an indication of the quality and/or characteristics of a given template. In some implementations, the template metrics may be personalized such that a user is able to identify templates that are specifically relevant and/or helpful to them.

One aspect of the present disclosure relates to a system configured for determining and presenting a graphical user interface including template metrics. The system may include one or more hardware processors configured by machine-readable instructions. The processor(s) may be configured to manage templates for work unit records that define units of work managed, created, and/or assigned within a collaboration environment. The work unit records may include values for work unit parameters associated with the units of work. The templates for the work unit records may pre-populate values for a portion of the work unit parameters. The portion of the work unit parameters with pre-populated values included in a first template may include one or more sub units of work and titles of the one or more sub units of work. The first template may be usable to create the work unit records for one or more first units of work. The processor(s) may be configured to create one or more first work unit records based on the first template.

In some implementations, wherein the portion of the work unit parameters with pre-populated values included in the first template further include a description, a title, descriptions of the one or more sub units of work, one or more priorities for the one or more sub units of work, one or more categories for the one or more sub units of work, statuses of the one or more sub units of work, and/or other pre-populated values.

Individual ones of the first work unit records define individual ones of the first units of work. The processor(s) may be configured to monitor the units of work created using the templates to determine template information. Monitoring the units of work created using the templates may include monitoring and tracking users associated with the units of work, status updates for the units of work, user interactions with the units of work, and/or changes to the values for the work unit parameters associated with the units of work, such that the one or more first units of work are monitored to determine first template information.

In some implementations, a system for determining and presenting a graphical user interface including template metrics, may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of a template component, a work unit record component, a work unit monitoring component, a template metric component, a graphical user interface component, a marketplace component, an environment state component, and/or other instruction components.

The template component may be configured to manage templates for work unit records that define units of work managed, created, and/or assigned within a collaboration environment. The work unit records may include values for work unit parameters associated with the units of work. The templates for the work unit records may pre-populate values for a portion of the work unit parameters. The portion of the work unit parameters with pre-populated values included in a first template may include one or more sub units of work and titles of the one or more sub units of work. The first template is usable to create the work unit records for one or more first units of work.

The work unit record component may create one or more first work unit records based on the first template. Individual ones of the first work unit records may define individual ones of the first units of work.

The work unit monitoring component may be configured to monitor the units of work created using the templates. The units of work created using the templates may be monitored to determine template information. Monitoring the units of work created using the templates may include monitoring and/or tracking users associated with the units of work, status updates for the units of work, user interactions with the units of work, changes to the values for the work unit parameters associated with the units of work, and/or other events and/or actions associated with the units of work. As such, one or more of the first units of work are monitored to determine first template information.

Template metric component may be configured to determine template metric values for template metrics associated with the templates. The template metric values may be determined based on the template information. As such, the first template metric values for the template metrics associated with the first template may be determined based on the first template information. The template metric values may include one or more of a completion metric, a collaboration metric, a personalized metric, and/or other metrics. In some implementations, the template metric values may be determined dynamically on a continuous or semi-continuous basis.

In some implementations, the template metrics may be determined based on the values of user parameters. As such, the template metrics may be customized for the users. In some implementations, the values of the user parameters may indicate what type of work the users typically do, one or more teams and/or projects the users belong to, and/or characterize the previous actions and/or interactions of the users with the collaboration environment.

Graphical user interface component may be configured to effectuate presentation of a graphical user interface including the templates, the template metric values for the template metrics associated with the templates, and/or other information. A first graphical user interface for a first user may include the first template, the first template metric values, and/or other information. In some implementations, graphical user interface component may be configured to determine a user to which the graphical user interface is to be presented. In some implementations, effectuating presentation of the graphical user interface may include customizing the graphical user interface for the given user determined by the graphical user interface component.

Marketplace component may be configured to receive user input from a second client computing platform associated with a second user. The user input may include a selection of one or more of the templates included in the graphical user interface. For example, the user input indicates selection of the first template. The marketplace component may be configured to receive an amount of consideration corresponding to the first template selected via the user input. The marketplace component may be configured to effectuate transmission of the first template to the second client computing platform associated with the second user.

In some implementations, marketplace component may be configured to receive user input from a second client computing platform associated with a second user. The user input may include a selection of one or more of the templates included in the graphical user interface. By way of example, the user input may indicate selection of the first template. The marketplace component may be configured to receive a second template from the second client computing platform associated with the second user in exchange for the first template. The marketplace component may be configured to effectuate transmission of the first template to the second client computing platform associated with the second user.

The environment state component may be configured to manage environment state information maintaining the collaboration environment, the environment state information including values of user parameters that are organized in user records corresponding to users interacting with and viewing the collaboration environment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
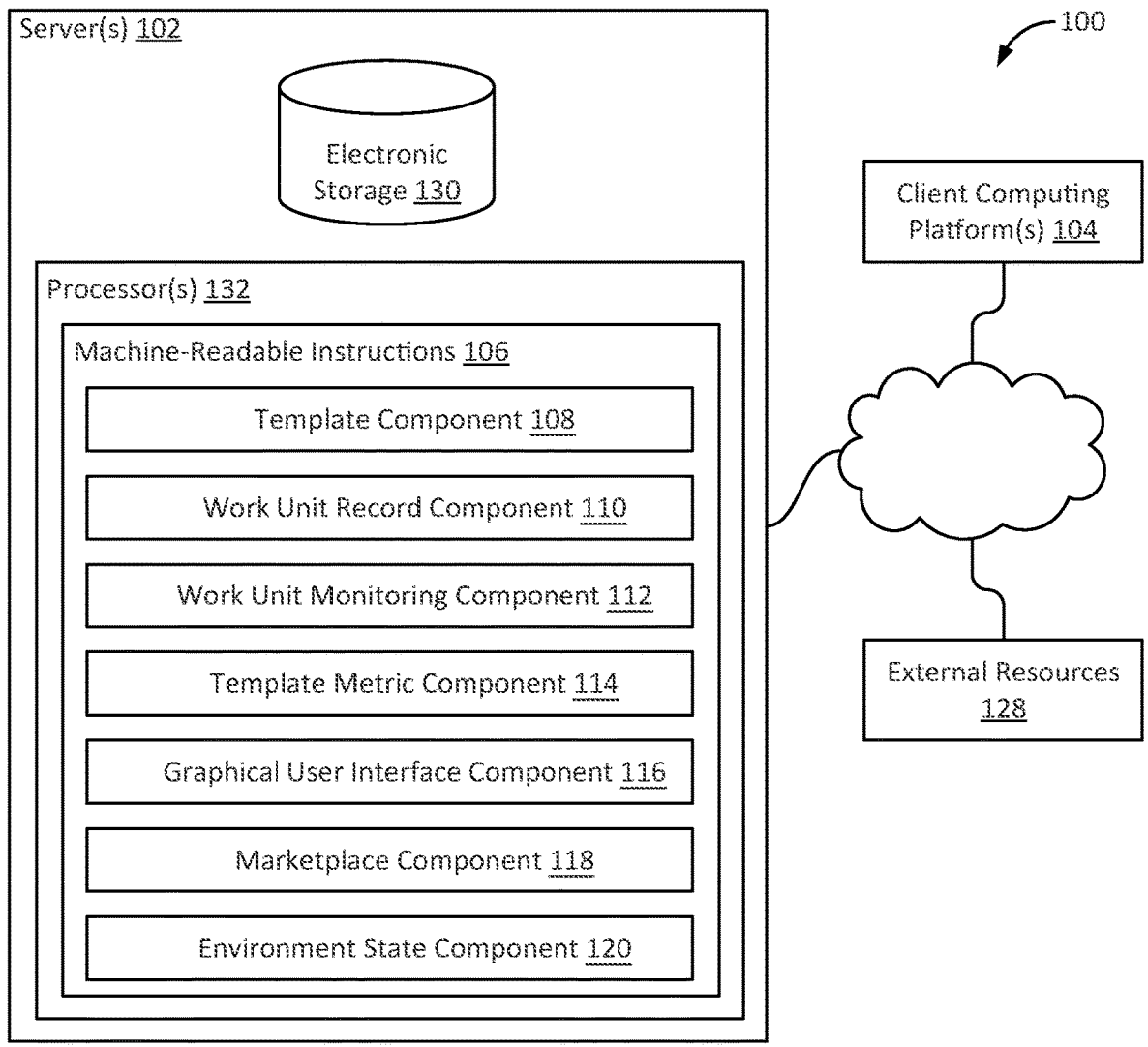
FIG. 1 shows a system configured for determining and presenting a graphical user interface including template metrics, in accordance with one or more implementations.

FIG. 1 illustrates a system 100 configured for determining and presenting a graphical user interface including template metrics, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a template component 108, a work unit record component 110, a work unit monitoring component 112, a template metric component 114, a graphical user interface component 116, a marketplace component 118, an environment state component 126, and/or other instruction components.

Template component 108 may be configured to manage templates for work unit records that define units of work managed, created, and/or assigned within a collaboration environment. The work unit records may include values for work unit parameters associated with the units of work. The templates for the work unit records may pre-populate values for a portion of the work unit parameters. The portion of the work unit parameters with pre-populated values included in a first template may include one or more sub units of work, titles for the one or more sub units of work, and/or other pre-populated values. In some implementations, by way of non-limiting example, the portion of the work unit parameters with pre-populated values included in the first template further include a description, a title, descriptions of the one or more sub units of work, one or more priorities for the one or more sub units of work, one or more categories for the one or more sub units of work, a status of the one or more sub units of work, and/or other portions of the work unit parameters.

The work unit parameters for work units managed, created, and/or assigned within the collaboration environment may include parameters describing one or more work units managed, created, and/or assigned within the collaboration environment and/or via the collaboration work management platform, and/or the metadata associated with the one or more work units. Individual ones of the work units may be associated with individual ones of the work unit records. A work unit record may define values of the work unit parameters associated with a given work unit managed, created, and/or assigned within the collaboration environment and/or via the collaboration work management platform. A given work unit may have one or more owners and/or one or more team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given work unit may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a work unit name, a work unit description, one or more work unit dates (e.g., a start date, a due date, a completion date, and/or other work unit dates), one or more members associated with a unit of work (e.g., an owner, one or more other project/task members, member access information, and/or other work unit members and/or member information), a status and/or progress (e.g., an update, a hardcoded status update, a measured status, quantity of work units remaining in a given project, completed work units in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

Figure 2A:
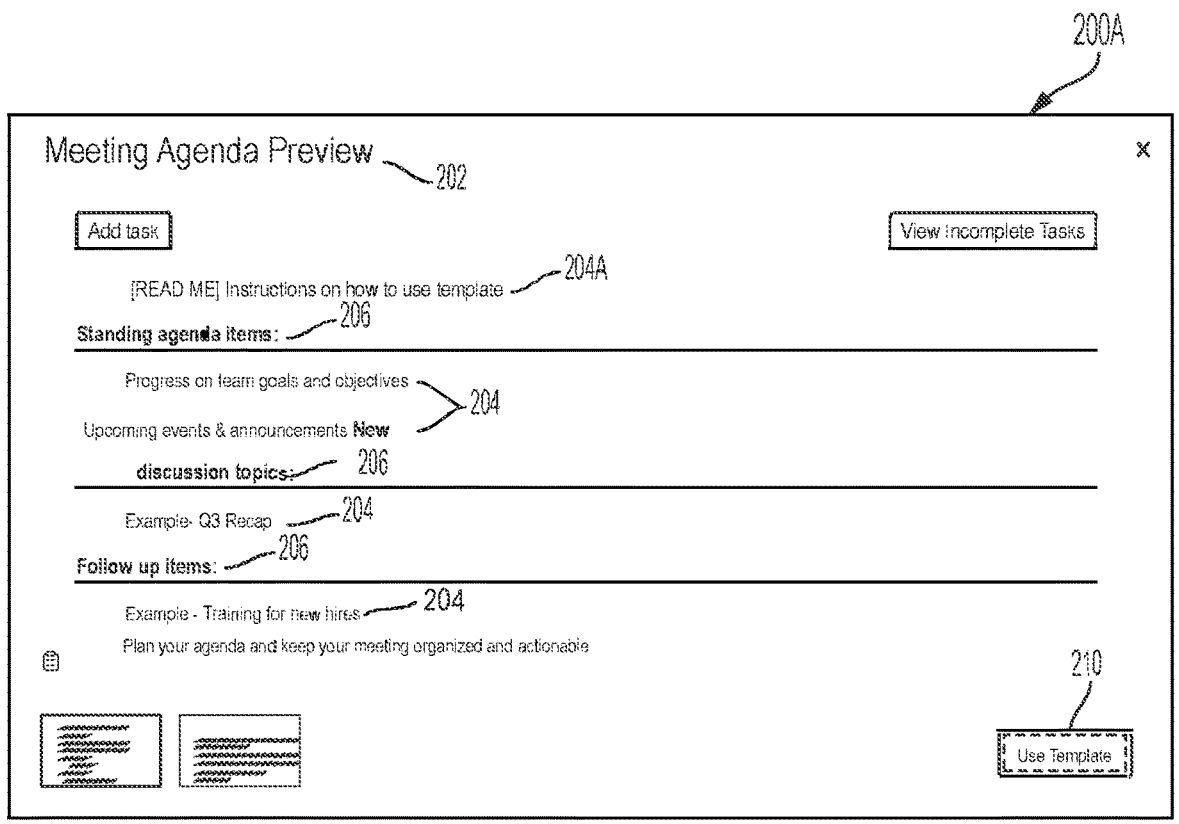
FIGS. 2A and 2B illustrate previews of a template usable to create work unit records that define one or more units of work, in accordance with one or more implementations.
Figure 2B:
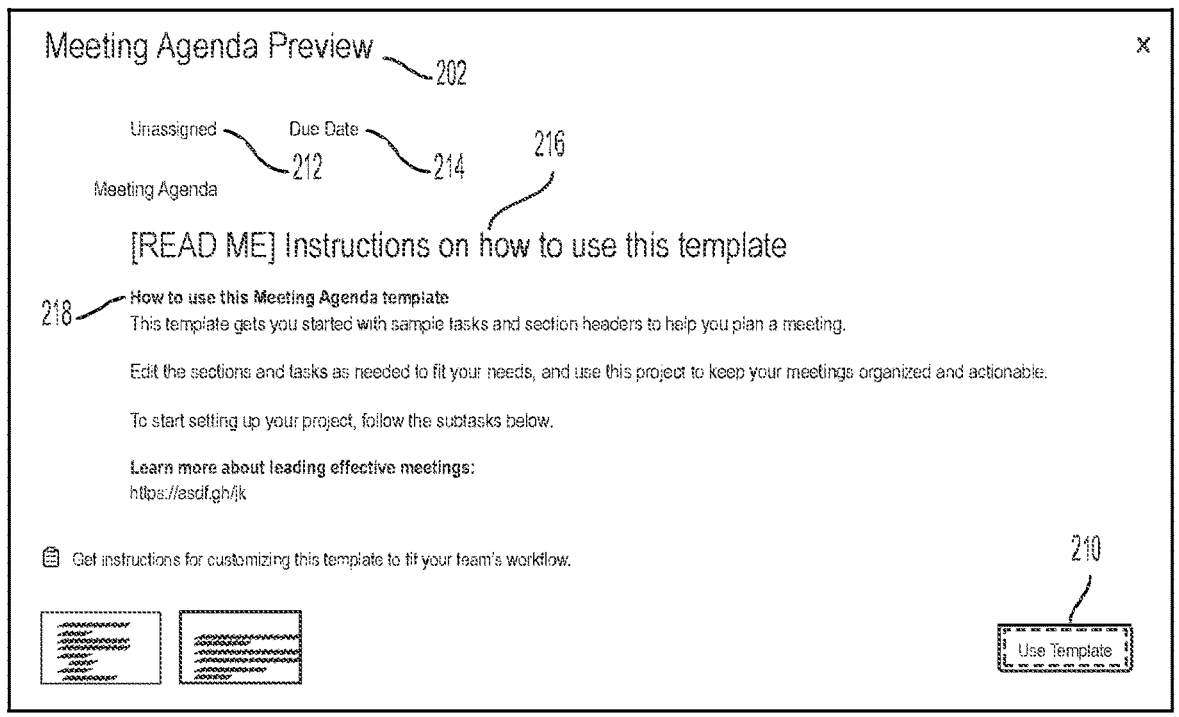

FIGS. 2A and 2B illustrate previews of a template usable to create work unit records that define one or more units of work, in accordance with one or more implementations. Template 200 may be presented to one or more users via previews 200A (see e.g., FIG. 2A) and 200B (see e.g., FIG. 2B). Template 200 (illustrated in previews 200A and 200B) may include a pre-populated title 202. Pre-populated title 202 may be updated and/or changed by a user. FIG. 2A illustrates a preview 200A corresponding to template 200. Preview 200A of template 200 may include pre-populated titles for one or more subunits of work 204. In some implementations, the subunits of work may be broken down into categories 206 for the subunits of work. Template selection button 210 may be selected by a user to use template 200 to create a new unit of work. FIG. 2B illustrates a preview 200B corresponding to a user selecting and/or opening sub unit of work 204A presented in preview 200A as illustrated in FIG. 2A. Preview 200B of template 200 may include a pre-populated sub unit title 216 for sub unit of work 204A. Description 218 may include a pre-populated description of subunit of work 204 corresponding to sub unit title 216. Preview 200B of template 200 may include an assignment value 212, a due date value 214, and/or other values that may not be pre-populated within template 200B. Instead, assignment value 212, a due date value 214, and/or other values may be set and/or determined by the user.

Returning to FIG. 1, work unit record component 110 may be configured to create one or more work unit records based on a given template. The work unit records may be created based on the template such that the work unit records may include the pre-populated values, updated values, and/or new values for the work unit parameters. Responsive to work unit record component creating one or more work unit records based on the templates, the values for the work unit parameters organized in the work unit records may be stored as state information for the collaboration environment. By way of example, work unit record component 110 may be configured to create one or more first work unit records based on the first template. Individual ones of the first work unit may record define individual ones of the first units of work.

Work unit monitoring component 112 may be configured to monitor the units of work created using the templates to determine template information. The template information may characterize one or more actions and/or interactions associated with and/or related to the units of work monitored (e.g., the units of work created from a given template). By way of non-limiting example, monitoring the units of work created using the templates may include monitoring and tracking users associated with the units of work, status updates for the units of work, user interactions with the units of work, changes to the values for the work unit parameters associated with the units of work, and/or other actions and/or interactions related to the units of work.

The one or more first units of work may be monitored to determine first template information. As such, for example, actions and/or interactions related to the first units of work may be monitored to determine first template information characterizing the actions and/or interactions of users associated with the first units of work, status updates for the first units of work, changes to the values for the work unit parameters associated with the first units of work, and/or other actions and/or interactions related to the first units of work Template metric component 114 may be configured to determine template metric values for template metrics associated with the templates. The template metric values may be determined based on the template information. The template metric values for a given template may be determined based on the template information determined by monitoring the units of work created from the given template. For example, first template metric values for the template metrics associated with the first template may be determined based on the first template information. In some implementations, the template metric values may be determined dynamically on a continuous or semi-continuous basis. In some implementations, the template metric values may be determined responsive to an initiating action by a user.

The template metric values may include values for one or more of a completion metric, a collaboration metric, a personalized metric, and/or other template metrics. The values for the completion metric may indicate a completion rate, percentage, and/or likelihood for units of work created using a given template. The values for the collaboration metric may indicate a level of collaboration, a number of collaborating users, an average number of collaborating users, how many collaborating users associated, the breakdown (e.g., by amount of input, user title, user position, etc.) of collaboration, and/or whether or not collaboration is likely for units of work created using a given template. The values for the personalized metrics may include one or more metrics specific to a given user. For example the values for the personalized metrics may indicate how beneficial or relevant a given template might be for a given user, one or more characteristics of the given template that may be important or relative to the given user, values for metrics important to a given user (e.g., that the given user needs/wants to improve, that may specifically help the given user, etc.), a clone rate (e.g., how often units of work created from a given template get cloned), a portfolio rate (e.g., how often units of work created from a given template are included in a portfolio or group of units of work, for example "30% of users who download this template end up showing the project in their department's portfolio"), external success metrics (e.g., data from integrations, success metrics pulled from third parties, etc. For example, "teams who use this project meet their Salesforce goals 95% of the time."). and/or values for other personalized metrics.

Graphical user interface component 116 may be configured to effectuate presentation of a graphical user interface including the templates, the template metric values for the template metrics associated with the templates, and/or other information. A first graphical user interface for a first user may include the first template, the first template metric values, and/or other information. In some implementations, template metrics may be presented with template titles and/or previews, and/or responsive to a user selecting to view the template metrics.

In some implementations, effectuating presentation of the graphical user interface may include determining a user to which the graphical user interface is to be presented. Which users graphical user interface is to be presented to the determined based on receiving user input requesting to view and/or access available templates. Effectuating presentation of the graphical user interface may include customizing the graphical user interface for the user determined.

Figure 3:
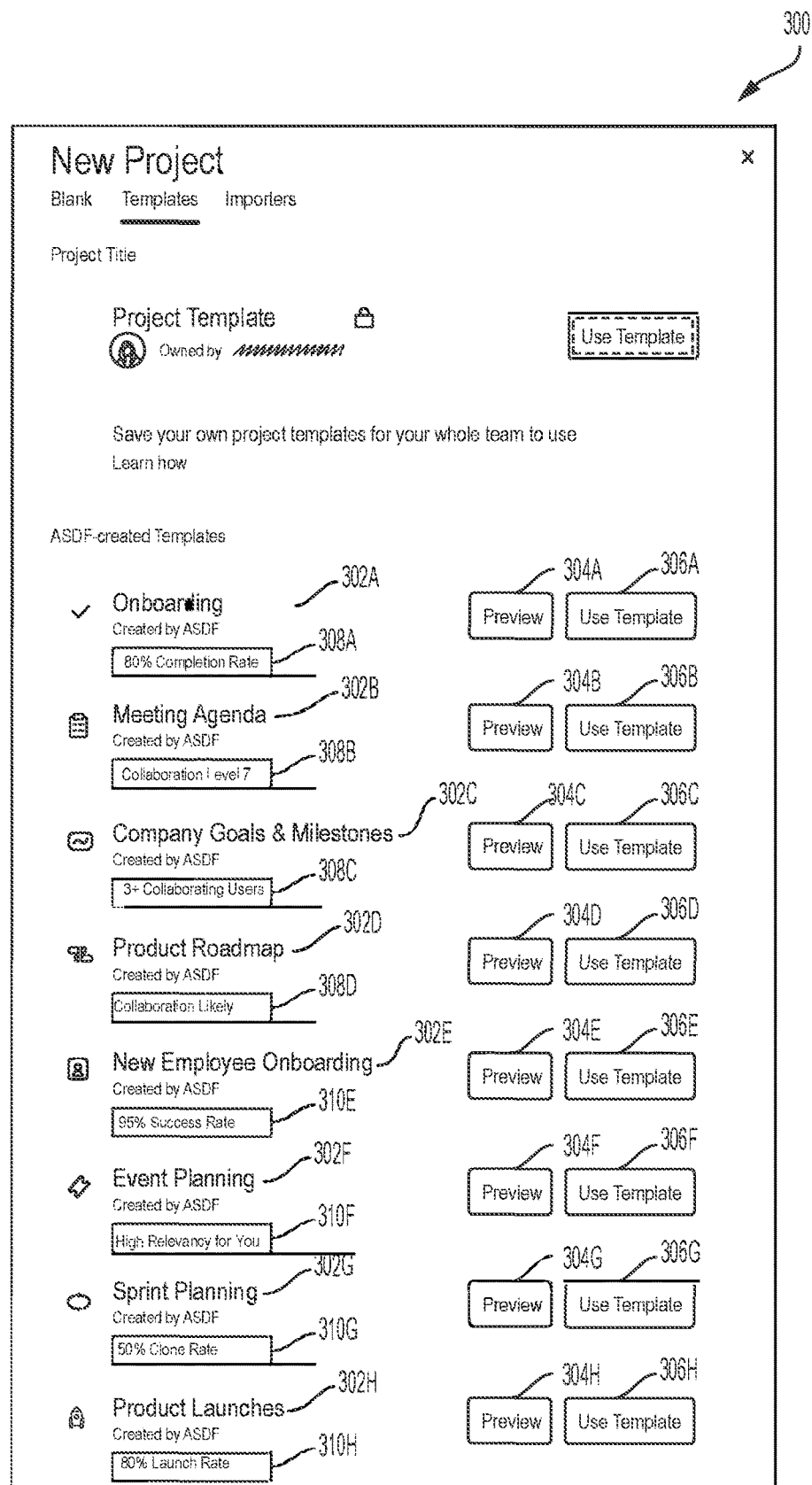
FIG. 3 illustrates a graphical user interface including the templates and the template metric values, in accordance with one or more implementations.

FIG. 3 illustrates a graphical user interface including the templates and the template metric values, in accordance with one or more implementations. Graphical user interface 300 may include templates 302, preview buttons 304, selection buttons 306, template metric values 308 corresponding individual ones of the templates 302, and/or other information. In some implementations, selection buttons 306 may comprise purchase buttons.

Returning to FIG. 1, in some implementations, marketplace component 118 may be configured to facilitate buying, selling, and or trading template. Marketplace component 118 may be configured to receive user input from a second client computing platform associated with a second user. The user input may select one or more of the templates included in the graphical user interface, such that the user input indicates selection of the first template. The user input may indicate selection of one or more template user wants to purchase. The templates may be associated with an amount of consideration that must be exchanged for the template. Marketplace component 118 may be configured to receive an amount of consideration corresponding to the first template selected via the user input.

In some implementations, marketplace component 118 may be configured to receive user input from a second client computing platform associated with a second user. The user input may select one or more of the templates included in the graphical user interface. Responsive to the user input indicating selection of the first template, marketplace component 118 may be configured to effectuate transmission of the first template to the second client computing platform associated with the second user, and/or receive a second template from the second client computing platform associated with the second user in exchange for the first template.

Environment state component 126 may be configured to manage environment state information maintaining the collaboration environment. The environment state information may include values of user parameters that are organized in user records corresponding to users interacting with and viewing the collaboration environment. The template metrics may be further determined based on the values of user parameters such that the template metrics are customized for the users. The values of the user parameters may indicate what type of work the users typically do. The values of the user parameters may indicate one or more teams and/or projects the users belong to. In some implementations, the values of the user parameters may characterize previous actions and/or interactions of the users with the collaboration environment.

Environment state component 108 may be configured to manage environment state information maintaining a collaboration environment. The environment state information may include values of user parameters, the values of work unit parameters, and/or values of other parameters. By way of non-limiting example, the values of the user parameters may be organized in user records corresponding to users interacting with and viewing the collaboration environment.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other work unit order, etc.), one or more authorized applications, one or more presence/interaction parameters (e.g., indicating presence and/or interaction level at an environment level, work unit level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, workload information, schedule information, historical information, other user parameters for the given user, and/or other user parameters and/or work unit parameters, for one or more work units the given user is associated with.

In some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 4:
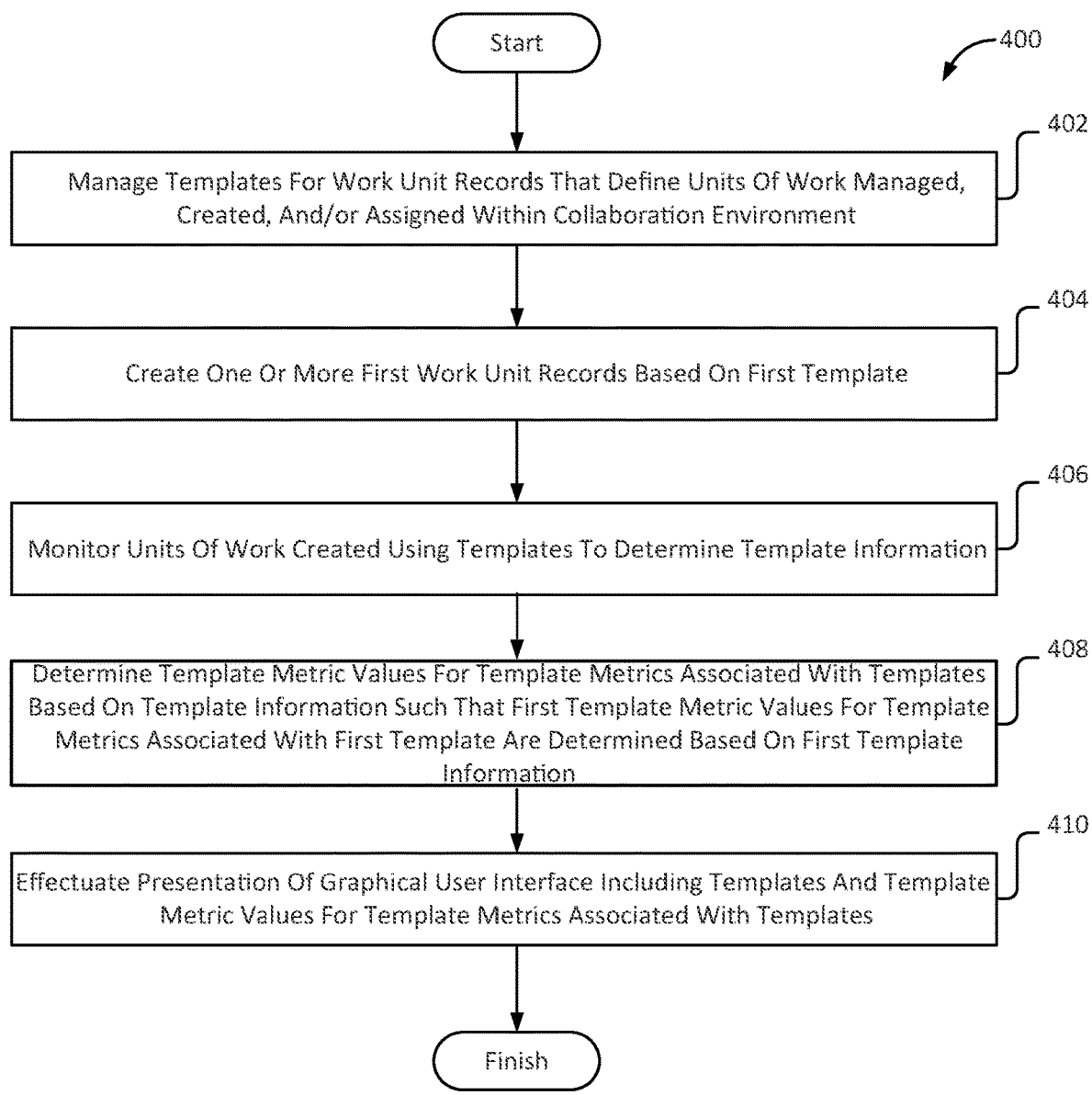
FIG. 4 illustrates includes a flow chart of a method for determining and presenting a graphical user interface including template metrics, in accordance with one or more implementations.

FIG. 4 illustrates a method 400 for determining and presenting a graphical user interface including template metrics, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include managing templates for work unit records that define units of work managed, created, and/or assigned within a collaboration environment.

The work unit records may include values for work unit parameters associated with the units of work. The templates for the work unit may record pre-populate values for a portion of the work unit parameters. The portion of the work unit parameters with pre-populated values included in a first template may include one or more sub units of work and titles of the one or more sub units of work. The first template may be usable to create the work unit records for one or more first units of work. Operation 402 may be performed by one or more hardware processors configured by machine-readable instructions including a component that is the same as or similar to template component 108, in accordance with one or more implementations.

An operation 404 may include creating one or more first work unit records based on the first template. Individual ones of the first work unit may record define individual ones of the first units of work. Operation 404 may be performed by one or more hardware processors configured by machine-readable instructions including a component that is the same as or similar to work unit record component 110, in accordance with one or more implementations.

An operation 406 may include monitoring the units of work created using the templates to determine template information. Monitoring the units of work created using the templates may include monitoring and tracking users associated with the units of work, status updates for the units of work, user interactions with the units of work, and/or changes to the values for the work unit parameters associated with the units of work, such that the one or more first units of work are monitored to determine first template information. Operation 406 may be performed by one or more hardware processors configured by machine-readable instructions including a component that is the same as or similar to work unit monitoring component 112, in accordance with one or more implementations.

An operation 408 may include determining template metric values for template metrics associated with the templates based on the template information such that first template metric values for the template metrics associated with the first template are determined based on the first template information. The template metric values may include one or more of a completion metric, a collaboration metric, and/or a personalized metric. Operation 408 may be performed by one or more hardware processors configured by machine-readable instructions including a component that is the same as or similar to template metric component 114, in accordance with one or more implementations.

An operation 410 may include effectuating presentation of a graphical user interface including the templates and the template metric values for the template metrics associated with the templates. A first graphical user interface for a first user may include the first template and the first template metric values. Operation 410 may be performed by one or more hardware processors configured by machine-readable instructions including a component that is the same as or similar to graphical user interface component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a graphical user interface, the system comprising:
   one or more hardware processors configured by machine-readable instructions to:
   monitor, by a server, a work unit record of a collaboration environment that was previously created within the collaboration environment through implementation of a template, wherein the work unit record is assigned to a user who is expected to accomplish one or more actions to complete work associated with the work unit record, the collaboration environment being configured to facilitate interaction by users with the work unit record, wherein the users access the collaboration environment via remotely located client computing platforms communicating with the server over one or more network connections;
   generate, by the server and based on monitoring the work unit record, template metric values for template metrics associated with the template, the template metric values characterizing the template based on ongoing user actions with respect to the work unit record previously created using the template, wherein the template metrics include a completion metric indicating a completion rate or a collaboration metric indicating a level of collaboration; and
   effectuate presentation of a graphical user interface displaying the template metric values for the template metrics associated with the template.

2. The system of claim 1, wherein implementing the template pre-populates information in the work unit record.

3. The system of claim 1, wherein the template metrics further include a personalized metric indicating a user-specific measure.

4. The system of claim 1, wherein the graphical user interface further displays representations of the template alongside the template metric values for the template metrics associated with the template, and wherein the one or more hardware processors are further configured by the machine-readable instructions to:
   obtain input information conveying user input including selection of the template displayed in the graphical user interface;
   obtain consideration information conveying reception of an amount of consideration corresponding to the template; and
   effectuate transmission of the template to a client computing platform.

5. The system of claim 1, wherein the one or more hardware processors are further configured by the machine-readable instructions to:
   host an online marketplace configured for buying, selling, and/or trading of templates.

6. The system of claim 1, wherein the template metrics are customized for an individual user.

7. The system of claim 6, wherein customizations are based on a type of work the individual user does.

8. The system of claim 6, wherein customizations are based on one or more teams and/or projects the individual user belongs to.

9. The system of claim 1, wherein the work unit record includes values for work unit parameters, the work unit parameters including a parameter characterizing a completion status of the work.

10. The system of claim 1, wherein effectuating presentation of the graphical user interface is responsive to obtaining a request from a user to access the template.

11. A method to provide a graphical user interface, the method comprising:
monitoring, by a server, a work unit record of a collaboration environment that was previously created within the collaboration environment through implementation of a template, wherein the work unit record is assigned to a user who is expected to accomplish one or more actions to complete work associated with the work unit record, the collaboration environment being configured to facilitate interaction by users with the work unit record, wherein the users access the collaboration environment via remotely located client computing platforms communicating with the server over one or more network connections;
generating, by the server and based on the monitoring the work unit record, template metric values for template metrics associated with the template, the template metric values characterizing the template based on ongoing user actions with respect to the work unit record previously created using the template, wherein the template metrics include a completion metric indicating a completion rate or a collaboration metric indicating a level of collaboration; and
effectuating presentation of a graphical user interface displaying the template metric values for the template metrics associated with the template.

12. The method of claim 11, wherein implementing the template pre-populates information in the work unit record.

13. The method of claim 11, wherein the template metrics further include a personalized metric indicating a user-specific measure.

14. The method of claim 11, wherein the graphical user interface further displays representations of the template alongside the template metric values for the template metrics associated with the template, and wherein the method further comprises:
obtaining input information conveying user input including selection of the template displayed in the graphical user interface;
obtaining consideration information conveying reception of an amount of consideration corresponding to the template; and
effectuating transmission of the template to a client computing platform.

15. The method of claim 11, further comprising:
hosting an online marketplace configured for buying, selling, and/or trading of templates.

16. The method of claim 11, wherein the template metrics are customized for an individual user.

17. The method of claim 16, wherein customizations are based on a type of work the individual user does.

18. The method of claim 16, wherein customizations are based on one or more teams and/or projects the individual user belongs to.

19. The method of claim 11, wherein the work unit record includes values for work unit parameters, the work unit parameters including a parameter characterizing a completion status of the work.

20. The method of claim 11, wherein the effectuating presentation of the graphical user interface is responsive to obtaining a request from a user to access the template.

* * * * *